Oct. 11, 1955   T. E. PIAZZE   2,720,246
CONTAINER MAKING MACHINE
Filed Feb. 24, 1951   7 Sheets-Sheet 1

INVENTOR.
Thomas E. Piazze,
BY
Cromwell, Greist & Warden
Attys

Fig. 4

United States Patent Office 2,720,246
Patented Oct. 11, 1955

2,720,246

CONTAINER MAKING MACHINE

Thomas E. Piazze, Mount Vernon, Ohio, assignor, by mesne assignments, to Continental Can Company, Inc., New York, N. Y., a corporation of New York Application February 24, 1951, Serial No. 212,541

16 Claims. (Cl. 154—42)

This invention relates to improvements in a machine for manufacturing merchandise containers or bags of flexible paper-like materials.

It is a general object of the invention to provide a machine which is adapted to fabricate receptacles or bags from a continuous length of flattened heat sealable tubular material by successively cutting the material into sections of predetermined length and transversely sealing one end of each successive section.

A more specific object of the invention is to provide a container or bag forming machine which comprises a pair of parallel endless conveyors having mounted in longitudinally spaced relation thereon cooperating transverse sealing bars which are adapted to engage in sealing relation on opposite sides of one end of successive predetermined lengths of heat sealable tubular material.

A further object of the invention is to provide a container fabricating machine comprising pairs of longitudinally extending parallel endless conveyors arranged in vertical alignment with the upper and lower runs of the respective lower and upper conveyors of each pair being in opposed relation and cooperating gripper means and sealing means arranged in longitudinally spaced relation on the respective pairs which are adapted to grip successive lengths of tubular material and transversely heat seal the same adjacent one end thereof.

Another and more specific object of the invention is to provide cooperating pairs of parallel endless conveyors, one conveyor of each pair being mounted above the other so that the upper run of the lower conveyor is in opposed relation to the lower run of the upper conveyor along a common horizontal plane extending lengthwise of the conveyors, one pair of the conveyors carrying longitudinally spaced transverse sealing irons which engage on opposite sides of one end of preformed sections of flattened tubular bag forming material, and the other pair of the conveyors carrying longitudinally spaced cooperating gripper bars which grip the successive bag forming sections of material while they are engaged by the sealing irons.

Another object of the invention is to provide a conveying mechanism for gripping and conveying successive lengths of flattened tubular material in a predetermined longitudinal path in combination with a sealing mechanism for providing a transverse seal on each successive length of material while it is conveyed in said path wherein the conveying and sealing mechanisms comprise pairs of parallel endless chain conveyors arranged one above the other, the respective upper and lower conveyors being mounted at the receiving end of the mechanism on common transverse shafts.

A further object of the invention is to provide in a bag fabricating machine cooperating sets of endless conveyors for gripping and transversely sealing successive lengths of flattened tubular bag forming material wherein sealing irons are provided on one set of the conveyors and gripper bars having protective cover members are provided on the other set of conveyors, the lengths of bag forming material being held between the cover members while the sealing irons are performing the transverse sealing operations.

Another object of the invention is to provide in a bag fabricating machine of the type described longitudinally extending sealing iron and gripper carrying conveyors of different lengths and a cooling means arranged beyond the shorter sealing conveyor whereby the seals formed on the bags are cooled before the bags are discharged from the machine by the longer gripping conveyor.

These and other objects of the invention will be apparent from a consideration of the form thereof which is shown by way of illustration in the accompanying drawings, wherein:

Fig. 6 is a vertical section, taken on the line 6—6 of Fig. 3a; and

Referring to the drawings, there is illustrated a supporting frame structure 10 which includes side, end and cross frame members arranged to provide a horizontal table-like top portion 11 and a horizontal bottom table-like portion 12. The top 11 of the frame supports a web feeding and cutting mechanism 13 and a horizontally aligned sealing mechanism 14. The bottom table portion 12 supports a motor 15 and a speed control mechanism 16 which is driven from the motor 15 by a connecting drive belt 17 and which has a driving connection with the feeding and sealing mechanisms 13 and 14, for operating the same in timed relation.

The machine is adapted to form containers from an endless web 18 of relatively flexible heat sealable flattened tubular material. The material forming the tube is preferably a transparent film of cellophane, Pliofilm, or the like, and it is preferably supplied as a preformed, extruded, seamless tube. However, the tube may also be formed from a web of sheet material by longitudinally folding and sealing the same.

Figure 1:
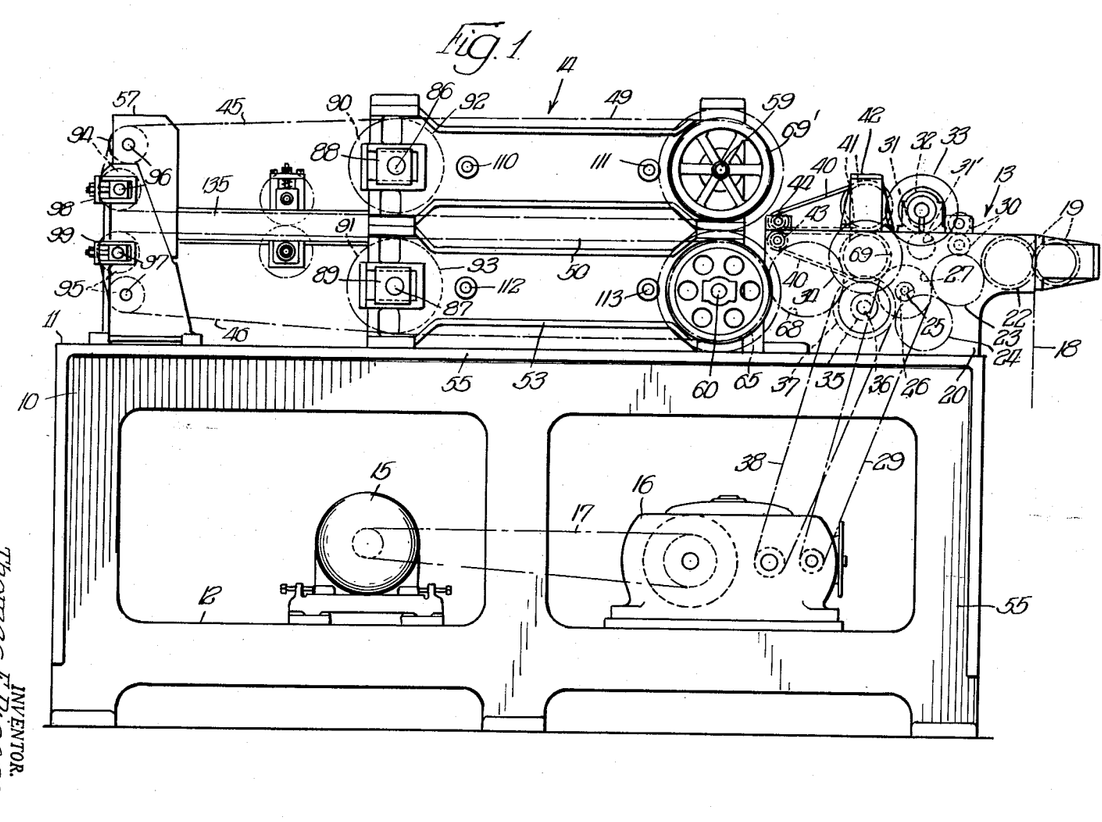
Fig. 1 is a side elevation of a container fabricating machine which incorporates therein the principles of the invention, with parts shown schematically.
Figure 2:
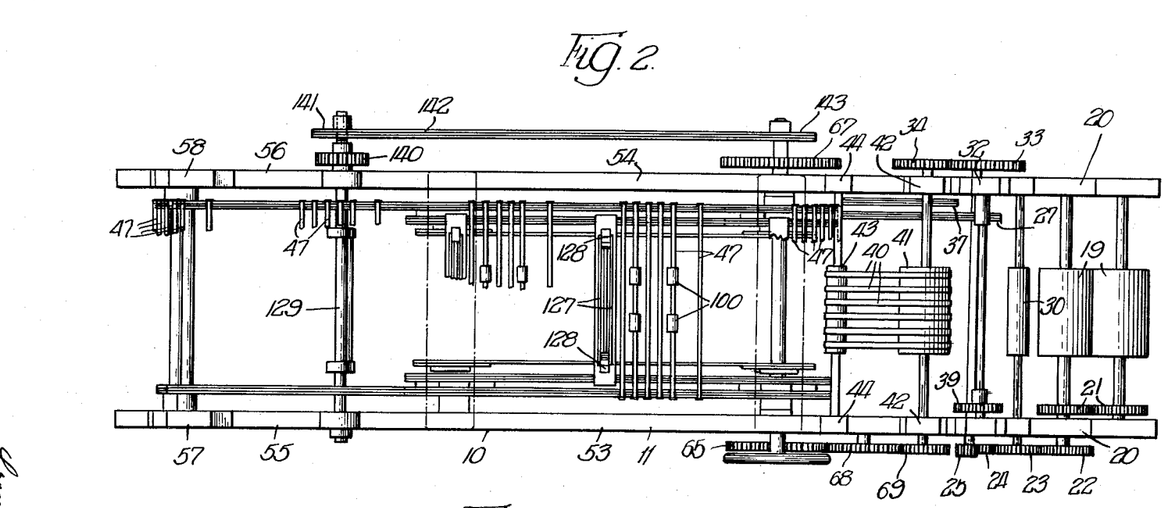
Fig. 2 is a plan view of the machine as shown in Fig. 1, with portions broken away.

The tubular stock 18 is fed into the machine by a pair of driven pull rollers 19 (Figs. 1 and 2). The rollers 19 are mounted on shafts which extend transversely of the supporting frame 10 and which are journaled at their opposite ends in laterally spaced side frame or plate members 20 secured on and extending upwardly of the top 11 of the supporting frame 10. The pull rollers 19 are connected in driving relation by gears 21 and one of them is provided with a gear 22 at one end of its shaft which is driven through connecting gears 23, 24 and 25, from drive shaft 26 which is connected in driving relation with the speed control device 16 by sprocket 27 and drive chain 29.

From the rollers 19 the tubed material 18 passes between a pair of idler rollers 30 to a rotatable cutting knife 31 which operates against a backing roller 31'. The cutting knife 31 is mounted on a transverse shaft supported by end bearings 32 on the top edge of the side plates 21 while the backing roller 31' is mounted on a transverse shaft journaled in the side plates 20. The knife shaft is driven by gear 33 on one end thereof and connecting gears 34 and 35 from drive shaft 36 which is connected in driving relation with the speed control device 16 by sprocket 37 and drive chain 38. The knife and backing roller shafts are connected in driving relation by gears 39.

As the bag material 18 passes beneath the knife 31 it is cut into sections or lengths of predetermined size and the leading edge of each successive section is fed between cooperating pairs of upper and lower belts 40, which extend to the sealing mechanism 14 and which deliver the cut sections of the material 18 in timed relation into the sealing mechanism 14. The belts 40 preferably each comprise a plurality of relatively narrow belt members extending longitudinally of the machine in spaced relation transversely thereof and being supported at one end on a pair of rollers 41, mounted on transverse shafts journaled at their ends in the side frame members 20 and bearings 42 and at the other end on a pair of idler rollers 43 which are also mounted on transverse shafts journaled in the side frame plates 20 and bearings 44. The belts 40 are driven by means of gear 34 which is on the one end of the supporting shaft for lower roller 41 and gear 35 on drive shaft 36. The tube lengths are fed successively by the belts 40 to the sealing mechanism 14.

The sealing mechanism 14 comprises upper and lower endless gripping conveyors 45 and 46 having mounted thereon a plurality of longitudinally spaced transversely extending cooperating gripper bars 47 and 48, respectively, which are adapted to grip the successive lengths of material and hold them in flat condition while they are carried through the sealing mechanism between opposed runs of the conveyors. The sealing mechanism also comprises upper and lower endless sealing conveyors 49 and 50 having mounted thereon a plurality of longitudinally spaced transversely extending cooperating sealing irons 51 and 52 which are adapted to engage on opposite sides of the leading ends of successive cut lengths of the tubular material to form transverse seals and close one end of each length of material. The pairs of conveyors 45, 46 and 49, 50 are arranged in parallel relation with the gripping conveyors 45, 46 being somewhat longer and extending beyond the conveyors 49, 50. The container forming sections of material are held in flat condition while the sealing irons 51 and 52 perform their sealing operation and for a short period thereafter to allow the seals to cool before the completed containers are discharged from the machine.

Figure 3A:
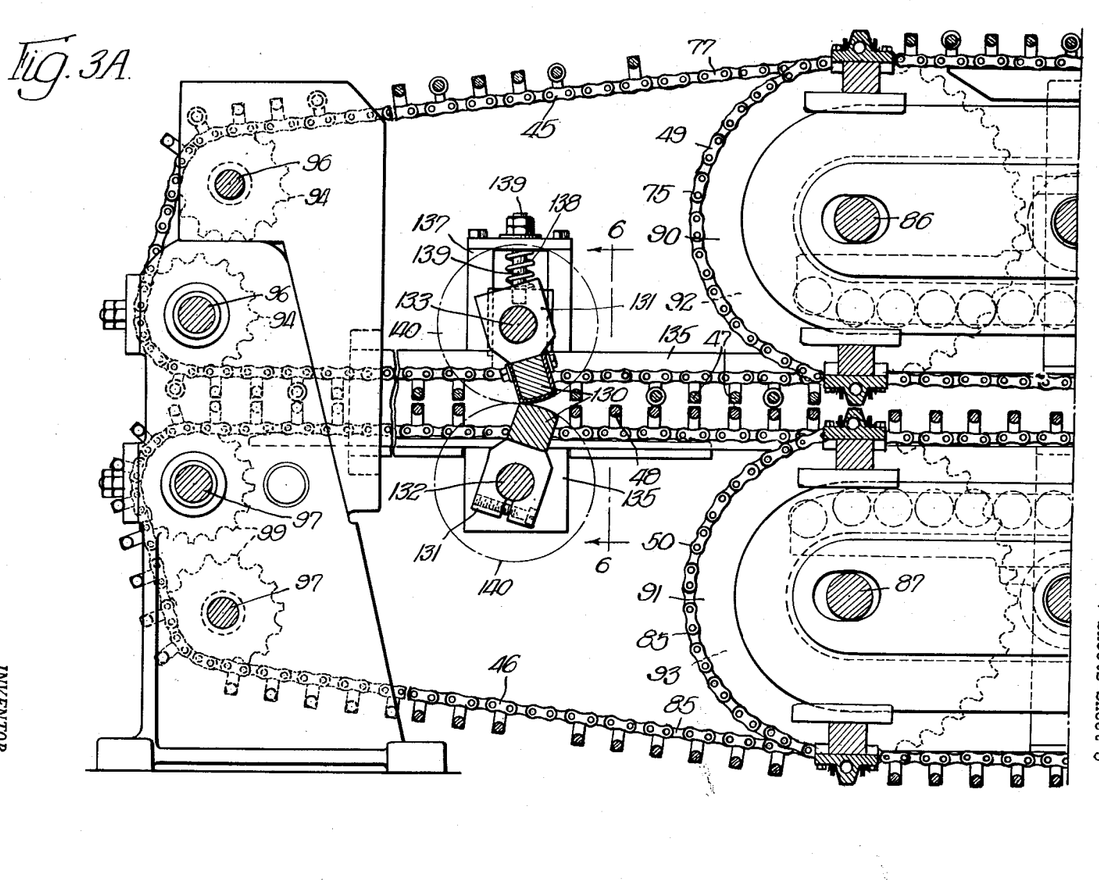
Figs. 3a and 3b constitute a longitudinal vertical section through the gripping and sealing portion of the machine to an enlarged scale.
Figure 4:
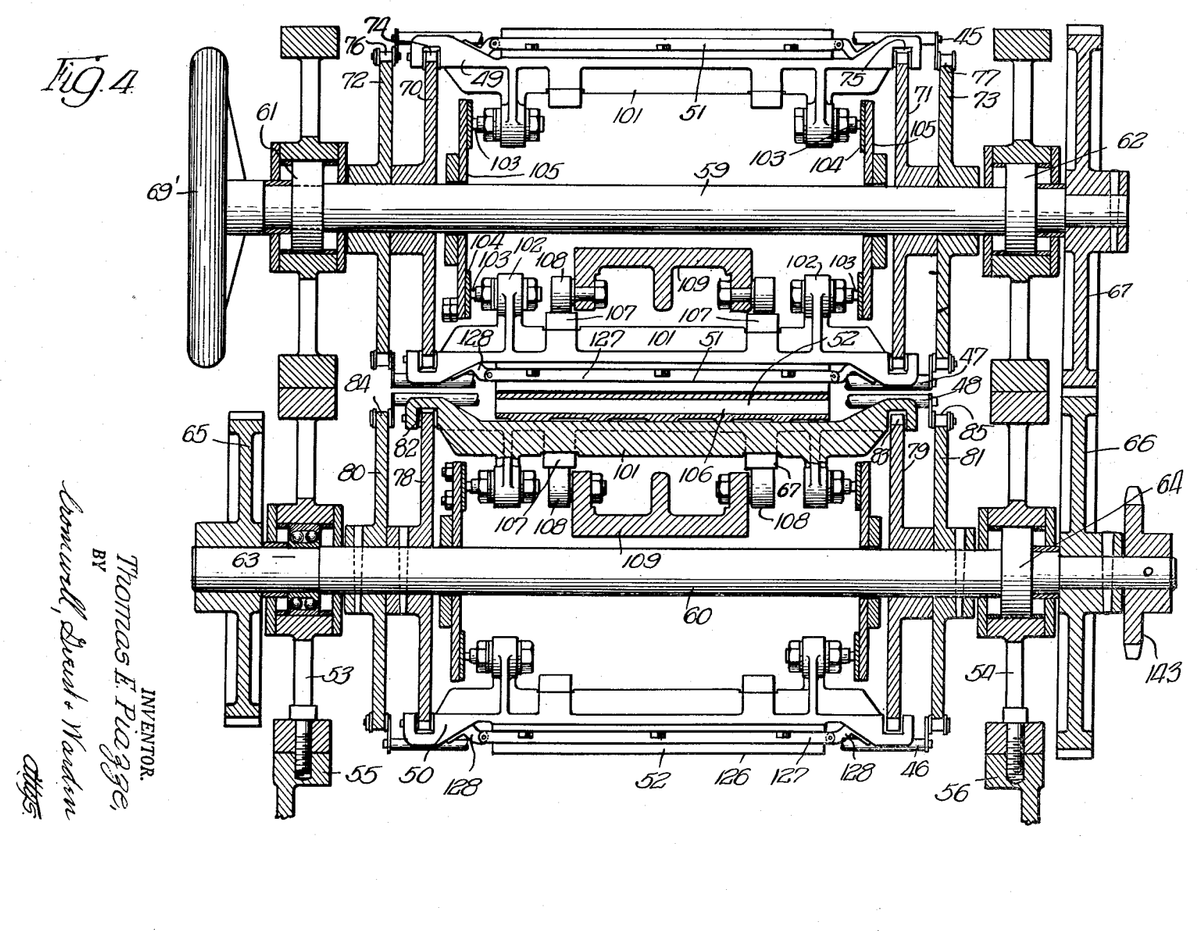
Fig. 4 is a transverse section, taken generally on the line 4—4 of Fig. 3b.

The gripping conveyors 45 and 46 and the sealing conveyors 49 and 50 are supported on the top 11 of the frame 10 by side frame members 53 and 54 (Fig. 4) which are arranged in transversely spaced upstanding relation and secured on the top side rails 55, 56 of frame 10. The gripping conveyors 45 and 46 which are somewhat longer than the sealing conveyors 49 and 50 extend beyond the forward ends of the later to an upstanding end support comprising side support members 57 and 58 (Figs. 1 and 3A) which are also secured on the top side rails 55, 56 of the frame 10. The side frame members 53 and 54 are connected at one end by rotatable vertically spaced, vertically aligned, upper and lower transverse shafts 59 and 60. The shafts 59 and 60 are journaled in the side frame members 53 and 54 at 61, 62 and 63, 64, respectively. The ends of shafts 59 and 60 extend outwardly of the side frame members 53 and 54 and receive gears 65 and 66 on shaft 60 and gear 67 on one end of shaft 59. Gear 67 on shaft 59 meshes with gear 66 on shaft 60 whereby the shafts are rotated in unison in opposite directions. Gear 65 on the shaft 60 is connected in driving relation with the drive shaft 36 by idler gear 68 and gear 69 on the driven shaft for the lower feed belt carrying roller 41. Shaft 59 is preferably provided at one end with a hand wheel 69′ for manual operation of the shafts.

Upper shaft 59 is provided adjacent opposite ends with laterally spaced inner sprockets 70, 71 and outer sprockets 72, 73, respectively. Inner sprockets 70 and 71 support one end of endless chains 74 and 75 which constitute the carrying elements for the upper sealing conveyor 49. Outer sprockets 72 and 73 support one end of endless chains 76 and 77 which constitute the conveying elements of the upper gripping conveyor 45. The lower shaft 60 is provided with corresponding inner sprocket members 78, 79 and outer sprocket members 80, 81 which support one end of chains 82 and 83 constituting the conveyor elements of the lower sealing conveyor 50 and endless chains 84 and 85 which constitute the conveying elements for the lower gripping conveyor 46, respectively.

At the other end of the vertical side supporting members 53 and 54 a pair of vertically spaced, vertically aligned, transversely extending shafts 86 and 87 (Fig. 1) are journaled in the side frames by adjustable bearings 88 and 89 which are identical on opposite sides of the machine. The shafts 86 and 87 are provided with pairs of inner sprockets 90, 91 and outer sprockets 92, 93, respectively. The inner sprockets 90 support the other ends of the chains 74 and 75 of the upper sealing conveyor 49. The inner sprockets 91 support the other ends of the corresponding chains 82 and 83 of the lower sealing conveyor 50. The outer sprockets 92 and 93 support intermediate portions of the chains 76, 77 and 84, 85 of the upper and lower gripping conveyors 45 and 46, respectively.

The gripping conveyors 45 and 46 extend beyond the sprockets 92 and 93, the chains 76, 77 and 84, 85 being supported at their ends on upper and lower pairs of sprockets 94 and 95 which are mounted on transversely extending pairs of idler shafts 96 and 97 which are arranged in vertical spaced relation and supported at their ends in bearings in the side frame members 57 and 58. One shaft of each pair of shafts 96 and 97 is longitudinally adjustable, the ends thereof being journaled in bearing members 98 and 99 which are longitudinally adjustable in the side frame members 57 and 58.

The gripper members 47 and 48 extend transversely of the machine and are secured at their ends to bearing plates connected to the links of the conveyor chains 76, 77 and 84, 85, respectively. Several of the gripper members 47 on the upper conveyor 45 are provided with pairs of relatively short sleeves or rolls 100 of resilient material arranged in laterally spaced relation thereon to provide positive engagement with cooperating gripper members 48 on the lower conveyor 46. The gripper members 47 and 48 are so arranged on the upper and lower conveyors 45 and 46, respectively, that they are vertically aligned with each other when traveling throughout a horizontal path. They cooperate with each other to grip the container material on opposite sides and hold it in flattened position. They may be spaced longitudinally as desired to insure proper gripping of the bag lengths and to provide clearance for operation of sealing irons 51 and 52.

The upper and lower sealing irons 51 and 52 are supported on the respective upper and lower conveyors 49 and 50 in an identical manner and the supporting structure will be described with reference to only one of these members, it being understood that a like structure is provided for supporting the corresponding sealing iron on the other conveyor. The sealing iron 51 is attached to the outer face of a transversely extending bracket or base bar member 101 which is connected at opposite ends to links of the chains 74 and 75. On the inner side, the bar 101 is provided with laterally spaced bracket arms 102 which support electrical contact or brush members 103. The brush members 103 are mounted in an outwardly directed socket with a spring urging the members in a conventional manner into contact with current conveying tracks or plates 104 which are supported on insulated plates 105 at opposite sides of the conveyor and which provide current carrying connection for heating elements 106 enclosed in the sealing iron 51. The tracks 104 are endless or arranged in a closed path and are supplied with current from a suitable source. The insulated plates are supported in a manner to be described.

The supporting bars 101 also carry inwardly projecting spaced bearing block members 107 which are adapted to engage pressure applying bearing rollers 108 mounted on opposite sides of a central longitudinally extending supporting pressure rail 109. The central rail 109 is mounted at opposite ends on a pair of longitudinally spaced transversely extending support bars 110 and 111 (Fig. 1). A corresponding rail 109 is mounted in aligned and opposed vertically spaced relation on a vertically spaced pair of transversely extending supporting bars 112 and 113 arranged beneath the bars 110 and 111.

The supporting bars 110, 111, 112 and 113 extend to and are mounted at their ends on the side frame members 53 and 54, the upper pair 110 and 111 being in longitudinal alignment with the upper connecting shafts 59 and 86 and the lower pair 112 and 113 being in longitudinally aligned relation with the lower connecting shafts 60 and 87.

Figure 3B:
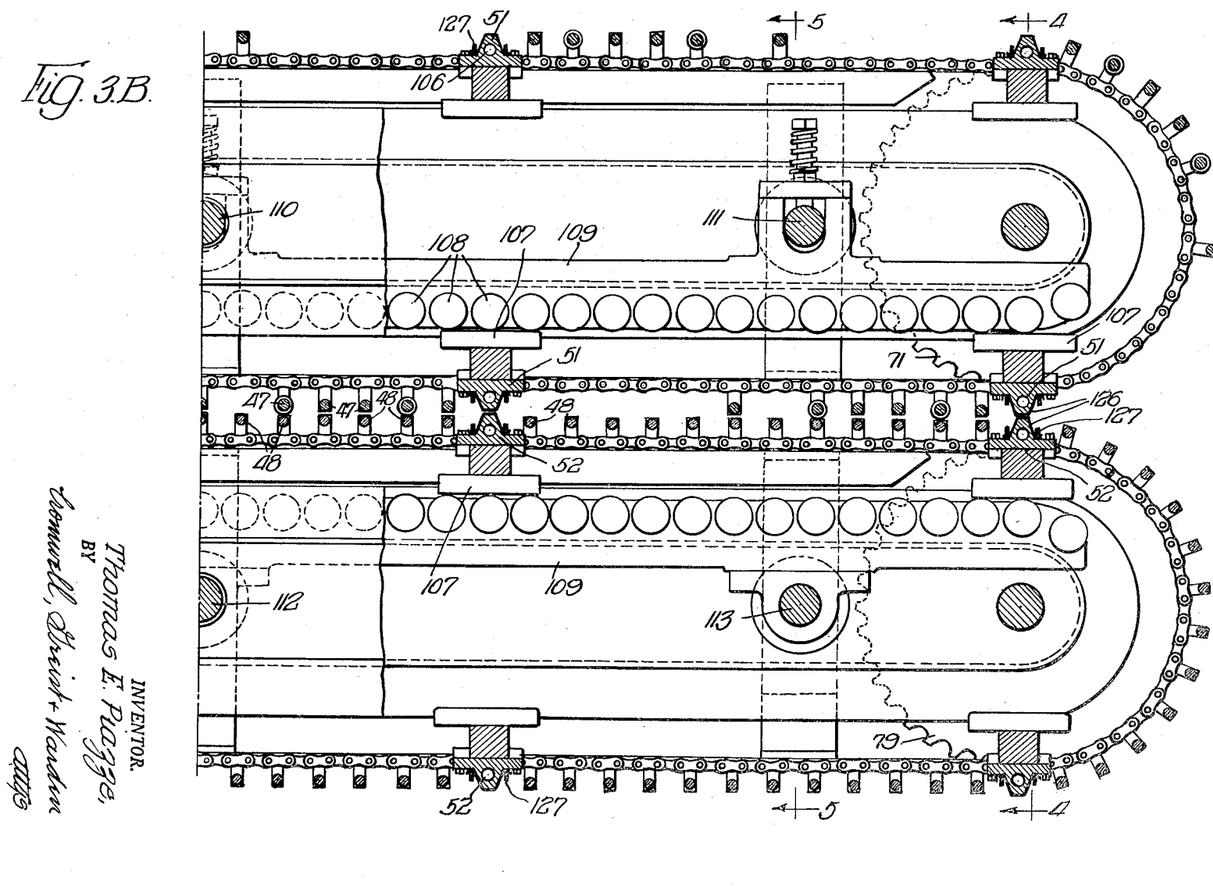
Figure 5:
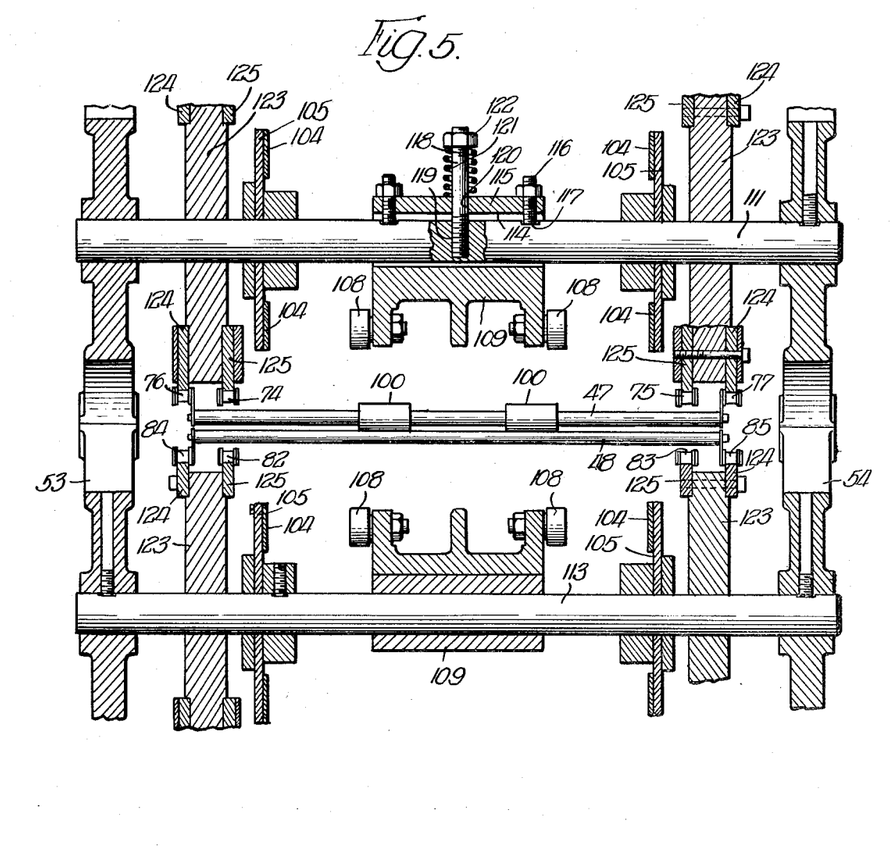
Fig. 5 is a transverse section, taken generally on the line 5—5 of Fig. 3b.
Figure 6:
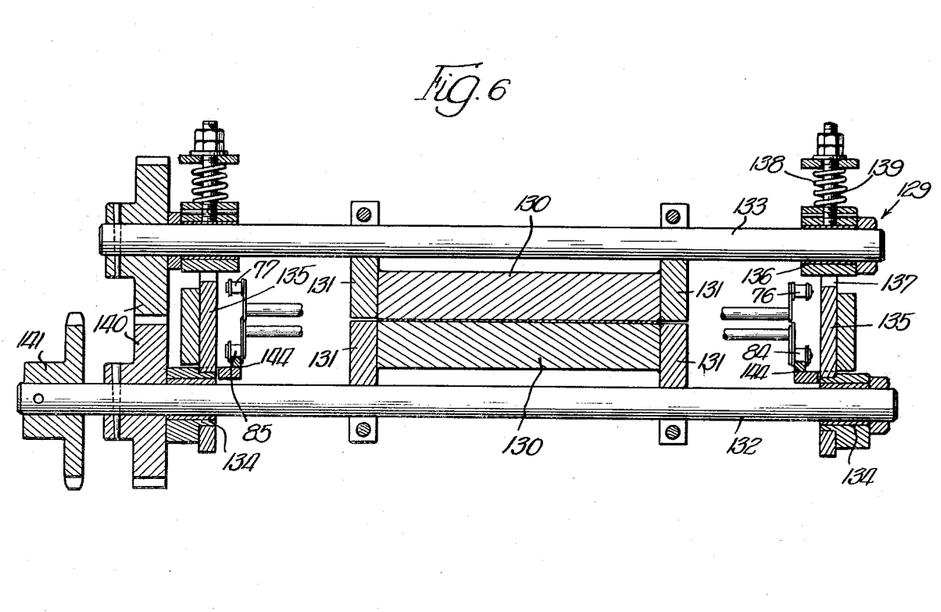

The upper longitudinal pressure rail 109 (Figs. 3B and 5) is mounted adjacent its ends on the transverse supporting bars 110 and 111 by upwardly extending bracket formations each provided with an elongate vertical recess 114 extending transversely of the machine through which the supporting bars 110 and 111 extend. The recess 114 is of greater diameter than the diameter of the supporting bar and permits a limited amount of adjustment of the rail 109 in the vertical direction.

The recess or slot 114 is closed at the top by a cross plate 115, bolted to the bracket formation. Adjusting studs 116 are provided at opposite ends of the cross plate 115 which extend therethrough and engage in sockets 117 provided in the fixed cross support bar 111. Adjustment of the studs 116 limits the downward movement of the pressure rail 109. A central stud 118 is engaged in threaded relation in a socket 119 in the cross bar 111 and extends through an aperture 120 in the top cross plate 115. The stud 118 receives on its upper end a compression loading spring 121 and a nut 122 which provides for adjustment of the compression in the spring 121. The lower rail 109 is supported in rigid relation on the fixed cross bars 112 and 113 with the rollers 108 engaging the bearing blocks 107 on the supporting member 101 which carries the lower sealing iron 52. The springs 121 on the opposite ends of the upper pressure rail 109 urge the rail downwardly and hold the rollers 108 in engagement with the bearing blocks 107 to apply pressure between the sealing irons 51 and 52.

The transverse bars 110, 111, 112 and 113 support adjacent their ends the insulated plates 105 which are provided with the current carrying tracks 104 for the brush members 103. The transverse bars 110, 111, 112 and 113 also support adjacent their outer ends pairs of laterally spaced vertical side plates 123 which extend substantially the length of the sealing conveyors. The plates 123 are provided along their upper and lower edges with outer and inner guide rails or tracks 124 and 125 for guiding the chains 76, 77 and 84, 85 of the gripping conveyors and the chains 74, 75 and 82, 83 of the sealing conveyors.

The sealing irons 51 and 52 (Figs. 2, 3B and 4) are each provided with a covering member 126 of flexible material which will not adhere to the softened bag material when Pliofilm polyethylene or similar film material is employed for the bags. The covering member 126 is secured by a pair of cross bars 127 which are pivotally connected to attaching brackets 128 at each end, the latter being secured to the top surface of the base bar 101 at the ends thereof by screws or similar fastening elements.

The gripping conveyors 45 and 46 are extended beyond the sealing conveyors 49 and 50 and carry the bags in a path in which a cooling device 129 (Fig. 1) is arranged to operate on the heat sealed cross seams. The cooling device 129 comprises a pair of cooperating cooling irons 130 of generally rectangular cross section which are mounted on end brackets or arms 131 secured to vertically spaced lower and upper transverse shafts 132 and 133. The lower shaft 132 is mounted in end bearings 134 depending from transversely spaced side supporting plates 135. The side plates 135 extend longitudinally between the main side frame supports 53 and the end supports 57. The upper shaft 133 is supported in end bearings 136 which are slidably mounted in slotted bearing brackets 137 extending above side support plates 135 and urged downwardly by a compression spring 138 on a vertically adjustable stud 139. A pair of interengaging gears 140 at one end of the shafts 132 and 133 insure positive timed relation of the shafts while lower shaft 132 is provided with a driving sprocket 141 which is connected by a drive chain 142 with a sprocket 143 on driven shaft 60.

The side plates 135 are provided with inwardly extending supports or tracks 144 for guiding and supporting the upper run of the chains 84 and 85 on the gripper conveyor 46. Suitable guides or tracks may be provided, of course, to support all the chains along any desired portion of their paths.

The cooling irons 130 may be provided with a protective cover, if desired, to prevent the softened bag material from adhering to the surface when it is pressed between the irons. Also one or both of the cooling members 130 may be supplied with a cooling medium, if desired, such as a circulating cooling fluid, by providing the necessary internal passageways for the fluid in the irons, their supporting arms and shafts and a suitably connected source of fluid supply.

Figure 7:
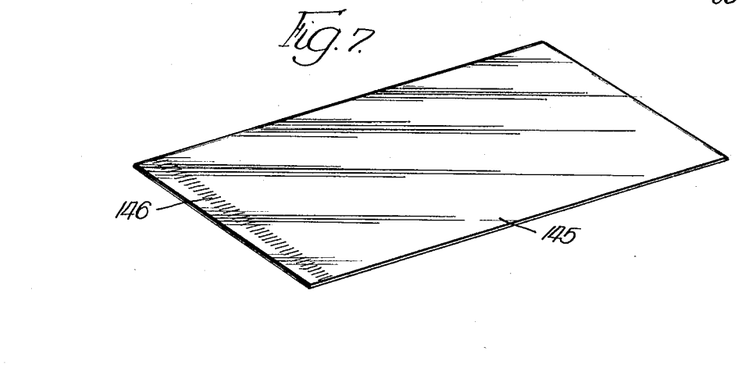
Fig. 7 is a perspective view of a container or bag fabricated on the machine.

The operation of the machine will be obvious from the description of the mechanism. The stock or bag material 18 is supplied in web form to the feed rollers 19 and passes through the idler rollers 30 to the cutter 31 which divides it into the desired lengths. The length of the sections may be varied by changing the relative speed of the feed rollers 19 and the cutter 31. From the cutter 31 the bag sections are conveyed by belts 40 to the sealer 14. The sections are held in proper position between the gripper rods 47 and 48 while the sealing bars 51 and 52 engage on opposite sides at the trailing end of the section to heat seal the bottom forming seam as the section is conveyed between the cooperating runs of the parallel conveyors. The gripping conveyors carry the transversely sealed tube sections beyond the sealing conveyors and between the cooling irons 130 which are properly timed to engage the heated seam portions of the successive tube sections between contacting surfaces thereof to press and cool the seam. The sealed tube sections which form complete bags 145 (Fig. 7) having transverse bottom end seals 146 are carried by the gripper conveyors beyond the cooling device 129 and discharged from the machine.

I claim:

1. A container making mechanism comprising means for feeding flattened tubular heat sealable material, means for initially dividing said material into separate container forming lengths, an elongate endless conveyor mechanism adjacent said dividing means for engaging and moving said separate lengths successively through a predetermined lineal path, transversely extending movable heat sealers, means for moving said heat sealers along a portion of said lineal path in seal forming engagement with each successive length of material adjacent one end of the same, seal pressing and cooling members, and means operative in another portion of said lineal path for engaging the seal pressing and cooling members with the transverse seals to cool the same.

2. A container making mechanism as recited in claim 1 wherein said endless conveyor mechanism comprises parallel spaced conveyor members which are supported at opposite ends on spaced shafts with oppositely disposed runs of the conveyor members arranged on opposite sides of said lineal path in cooperating spaced container gripping relation.

3. A container making mechanism as recited in claim 1 wherein said endless conveyor mechanism comprises two superimposed conveyor members and cooperating transversely extending longitudinally spaced gripper bars on the respective conveyor members adapted to engage in gripping relation on opposite sides of the lengths of container forming material for conveying said lengths through a lineal path extending between juxtaposed runs of said conveyor members.

4. A container fabricating machine comprising means for feeding flattened tubular heat sealing material, means for cutting said material into container forming lengths, means adjacent said cutting means for conveying said cut lengths in a single plane along a straight line path, and means operating in timed relation to said conveying means to transversely heat seal one end of each length of material, said conveying means and said heat sealing means each including a pair of elongate spaced endless conveyors, one run of one conveyor of each pair being in opposed spaced relation to a run of the other conveyor of said pair and the corresponding runs of the respective conveyors being operable in the same plane.

5. A container fabricating machine comprising means for feeding flattened tubular heat sealing material, means for cutting said material into sections of predetermined length, cooperating elongate endless conveyors having longitudinally spaced transverse bar members thereon adjacent said cutting means for gripping successive sections of material on opposite sides and for carrying the same in a single plane along a lineal path, and cooperating elongate endless conveyors having longitudinally spaced transversely extending heated sealing irons, said last mentioned conveyors being arranged to move said sealing irons into clamping position on opposite sides of said sections of material in longitudinally spaced relation to said transverse bar members for forming transverse seals.

6. A container fabricating machine comprising means for feeding flattened tubular heat sealing material, means for cutting said material into separate container forming lengths, means adjacent said cutting means for conveying said cut lengths along a lineal path, and means operating in timed relation to said conveying means to transversely heat seal one end of each length of material, said conveying means and said heat sealing means each including two elongate endless conveyor mechanisms arranged in spaced relation one above the other, the lower runs of the upper conveyors being in opposed relation to the upper runs of the lower conveyors and the corresponding runs of the upper and lower conveyors, respectively, being operable in the same plane.

7. A container fabricating machine as recited in claim 6 wherein said upper and lower conveyors, respectively, are mounted at one end on sprockets supported on common shafts and said shafts are driven in timed relation to each other.

8. A container fabricating machine comprising means for feeding flattened tubular heat sealable material, means for cutting said material into individual sections of predetermined length, a pair of cooperating elongate endless gripping conveyors mounted in parallel vertically spaced relation adjacent said cutting means and each having longitudinally spaced transverse bar members thereon for engaging successive sections of material on opposite sides to carry the same along a lineal path, and a pair of cooperating endless sealing conveyors also mounted in parallel vertically spaced relation each having longitudinally spaced transversely extending heated sealing irons for engaging on opposite sides of said sections of material while the sections of material are carried along said lineal path, said heated sealing irons being arranged to engage said material at predetermined areas between engagement of the same by said gripping bar members to form transverse seals in the material.

9. A container fabricating machine as recited in claim 8 wherein adjustable presser means is arranged along said lineal path for urging said heated sealing irons into engagement with said material.

10. A container fabricating machine comprising means for feeding flattened tubular heat sealable material, means for cutting said material into container forming lengths, means adjacent said cutting means for conveying said cut lengths along a lineal path, and means movable along said lineal path in timed relation to the movement of said conveying means to transversely heat seal one end of each length of tubular material, said conveying means and said heat sealing means each including a pair of elongate spaced endless conveyors, one run of one conveyor of each pair being in opposed relation to a run of the other conveyor of said pair and the opposed runs of the respective conveyors being operable on the cut lengths of the material as they are conveyed in a single plane along said lineal path.

11. A container fabricating machine comprising means for feeding flattened tubular heat sealable material, means for cutting said material into sections of predetermined length, a pair of cooperating endless conveyors having longitudinally spaced transverse gripper bar members thereon for engaging successive sections of material on opposite sides and carrying the same in a single plane along a lineal path, and a pair of cooperating endless conveyors having longitudinally spaced transversely extending heated sealing irons movable into clamping position on opposite sides of said sections of material while the sections of material are engaged by said gripper bars and carried in said plane along said lineal path for forming transverse seals at the ends of said sections.

12. In a container machine for forming heat seals in successive lengths of flattened tubular heat sealable material, longitudinally spaced pairs of vertically spaced sprockets, two pairs of endless chain conveyors arranged on said sprockets with opposed runs of the respective pairs operative along the same lineal path, each of said conveyors comprising two laterally spaced endless chains and connecting cross rods, the cross rods on one pair of conveyors cooperating to grip the lengths of material and move the same along said lineal path, and the cross rods on the other pair of conveyors having mounted thereon heat sealing members for engaging on opposite sides of the material as it moves along said lineal path.

13. In a container machine for forming heat seals in successive lengths of flattened tubular heat sealable material, longitudinally spaced pairs of vertically spaced sprockets, two pairs of conveyors each having a pair of laterally spaced chains arranged on said sprockets with each pair having opposed runs thereof operative along a common lineal path, each of said conveyors having the laterally spaced endless chains connected by cross rods, the cross rods on one pair of the conveyors cooperating to grip successive lengths of material and move the same along said lineal path, and longitudinally spaced heat sealing bars mounted on the cross rods on the other pair of conveyors, said heat sealing bars being positioned for engaging on opposite sides of the material as it moves along said lineal path.

14. In a container machine for forming heat seals in successive lengths of flattened tubular heat sealable material, longitudinally and vertically spaced pairs of sprockets, endless chain conveyors arranged on said sprockets with opposed runs thereof operative along a common lineal path, said chains being arranged in laterally spaced pairs forming endless conveyors, each pair of chains having connecting cross rods, the cross rods on one pair of conveyors cooperating to grip the lengths of material and move the same along said lineal path, and heat sealing irons on the other pair of conveyors for engaging on opposite sides of the material as it moves along said lineal path to form a transverse seam therein.

15. In a container machine for forming heat seals in successive lengths of flattened tubular heat sealable material, longitudinally spaced pairs of vertically spaced sprockets, two pairs of endless conveyors arranged on said sprockets with opposed runs of the respective pairs operative along the same lineal path, each of said conveyors comprising two laterally spaced endless members connected by cross members which cooperate to grip the lengths of material and move the same along said lineal path, and the other pair of conveyors having mounted thereon heat sealing members for engaging on opposite sides of the material as it moves along said lineal path.

16. In a container machine for forming heat seals in successive lengths of flattened tubular heat sealable material, longitudinally spaced pairs of vertically spaced sprockets, two pairs of endless chain conveyors arranged on said sprockets with opposed runs of the respective pairs operative along the same lineal path, each of said conveyors comprising two laterally spaced endless chains and connecting cross rods, the cross rods on one pair of conveyors cooperating to grip the lengths of material and carry the same along said lineal path, the cross rods on the other pair of conveyors having mounted thereon heat sealing members for engaging in sealing relation on opposite sides of the material as it is carried along said lineal path, said one pair of endless chain conveyors extending beyond the other pair of conveyors to advance the material beyond the lineal path traversed by said other pair of conveyors and a seal cooling device arranged adjacent the path of the material beyond said last mentioned lineal path.

References Cited in the file of this patent
UNITED STATES PATENTS

| | | |
|---|---|---|
| 2,125,758 | Waters | Aug. 2, 1938 |
| 2,206,965 | Lakso | July 9, 1940 |
| 2,467,879 | Billeb | Apr. 19, 1949 |